United States Patent [19]
Priese

[11] 4,044,994
[45] Aug. 30, 1977

[54] PRESSURE LOADED SEALING ARRANGEMENT

[75] Inventor: Werner K. Priese, Barrington, Ill.

[73] Assignee: Hills-McCanna Company, Carpentersville, Ill.

[21] Appl. No.: 622,387

[22] Filed: Oct. 14, 1976

Related U.S. Application Data

[63] Continuation-in-part of Ser. No. 421,777, Dec. 5, 1973, abandoned.

[51] Int. Cl.$^2$ .............................................. F16K 25/00
[52] U.S. Cl. ..................................... 251/172; 251/174; 251/315; 251/317
[58] Field of Search ............... 251/172, 173, 174, 315, 251/316, 317

[56] References Cited

U.S. PATENT DOCUMENTS

| | | | |
|---|---|---|---|
| 3,084,715 | 4/1963 | Scharres | 251/173 X |
| 3,181,834 | 5/1965 | Jennings | 251/172 |
| 3,409,269 | 11/1968 | Fawkes | 251/173 X |
| 3,528,448 | 9/1970 | Urban | 251/173 X |
| 3,563,510 | 2/1971 | Priese | 251/173 |
| 3,734,457 | 5/1973 | Roos | 251/174 |

*Primary Examiner*—Harold W. Weakley
*Attorney, Agent, or Firm*—Olson, Trexler, Wolters, Bushnell & Fosse, Ltd.

[57] ABSTRACT

There is disclosed a unique sealing arrangement for a valve of the type which includes a first element defining a valve body having a fluid passage extending therethrough, with a second, flow control element rotatably disposed in said passage for controlling the flow of fluid through said valve by movement between valve open and valve close positions. One of said elements, either the valve body or the flow control member, includes an annular sealing surface, while the other of said elements is provided with an annular seal ring support groove confronting said sealing surface in relative close proximity thereto, and having an annular seal ring member disposed therein. The seal ring member includes, in section, a first leg portion which provides an anchoring flange that is clamped between opposed side walls of the support groove, and a second leg portion including a free end and being formed to a reverse bent, hook-like configuration with a bight segment thereof extending from said groove for engagement with said sealing surface. The free end of said reverse bent configuration is spaced from the remainder of the seal to define an open mouth portion which permits line fluid to enter the interior or plenum chamber of the seal ring member thereby pressure loading said seal ring member into sealing engagement with said annular sealing surface and the side wall of the support groove. In addition, there is provided lip means extending transversely of said free end of the seal ring member which is engaged upon shoulder means provided on the opposed, confronting side wall surface of the support groove.

8 Claims, 16 Drawing Figures

PRESSURE LOADED SEALING ARRANGEMENT

REFERENCE TO RELATED APPLICATION

The present application is a continuation-in-part of U.S. application Ser. No. 421,777, filed Dec. 5, 1973, which application is now abandoned.

BACKGROUND OF THE INVENTION

The present invention relates to valves, and most particularly to a novel sealing arrangement for a valve wherein the seal ring member is pressure loaded by the line fluid.

Those skilled in the design of valves and valving components are continually seeking to improve and perfect valve constructions. Most particularly, considerable effort has been directed to the design of the sealing arrangements employed therewith. One example of a novel approach to the manner effecting a seal is shown in U.S. Pat. No. 3,563,510; issued to Werner K. Priese, the inventor herein, for a dynamic caulking seal which provides an improved sealing action. The present invention is capable of use to attain substantially the same dynamic caulking action, but is an improvement thereover in that it avoids some of the disadvantages inherent with prior art designs, while providing certain additional advantages not heretofore obtainable.

In the design and construction of a valve sealing arrangement, a number of factors must be taken into consideration. As will be apparent from the discussion to follow, the sealing arrangements employed in valves to date have generally resulted in a compromise as to these considerations. The present invention, is a step forward in that it achieves many of the desired operational features with less of the inherent disadvantages of prior art constructions.

Not too surprisingly, it is known that the best caulking or sealing action wherein a seal ring member is wedged into an annular corner is attained when the seal is constructed of a relatively flexible, elastic material that is easily deformed by line pressure. Seals of this type are adequate where there exists very little relative movement between said seal and the opposed sealing surfaces. However, where a valve construction employs a relatively movable flow control member, against which the seal must engage, these relatively soft elastic materials are undesirable as they wear quickly and soon result in leakage. In addition, with soft material, there is always a danger that should excessively high line pressures be encountered the seal may be extruded past the sealing surfaces. As such, there are a number of considerations which indicate that a certain degree of rigidity must be maintained in the sealing material, with this rigidity increasing as the size of the valve and the line pressures to be handled increase.

Another problem that must be faced in the design of valve components is that of attaining effective, initial sealing contact. That is, an operational sealing engagement must be maintained between the seal and the opposed sealing surfaces at low line pressures, viz., prior to the time wherein the line pressure is sufficiently high to force the seal into caulking engagement. If effective initial sealing contact is not attained, there is a danger that the fluid will leak past the seal initially and as line pressure builds up, the seal will be forced out of engagement with the opposed sealing surface. A rather obvious way of obtaining the desired initial sealing contact is to provide for a substantial amount of primary interference between the seal ring member and the sealing surface as the valve control member is moved to the valve closed position. However keeping in mind the previous discussion regarding the necessary rigidity of the seal ring member, it can be seen that when a rigid material is employed in conjunction with a high degree of initial interference, the amount of force required to operate the valve becomes quite high. This is a distinct disadvantage, especially where the valves are to be operated manually or must be operated rapidly. Here again, the magnitude of the problem increases as the size of the valve and the line pressures to be handled increase.

In comparison to the above-discussed problems, the present invention provides a sealing arrangement that attains a desirable, effective dynamic caulking action under pressure loading at extremely low or high temperatures; provides for an adequate initial seal; provides operational characteristics which permit relatively rigid materials to be employed so as to increase wearability at extremely low or high temperatures; and most importantly attains these advantages without requiring high operating forces. More specifically, the seal construction of the present invention employs an annular seal ring member, which in section, includes first and second leg portions, the former being relatively straight and providing an anchoring flange to be clamped between opposed surfaces of a support groove, and the second said leg portion being of a reverse bent, hook-like arcuate configuration, having a free end. Said reverse bent, hook-like configuration thereby provides an open mouth arrangement which enables line fluid to enter the seal and pressure load said seal into sealing engagement with the opposed sealing surfaces. In addition, due to the employment of the free end portion the seal is relatively flexible and will easily move inwardly of the support groove as it is engaged by the relatively movable opposed sealing surface thereby keeping operating force requirements relatively low. Further, said free end portion is provided with a transversely extending lip means that is engaged with the flange or shoulder on the confronting side wall of the support groove so as to maintain the seal within the groove and preventing unraveling or blow-out thereof, while also controlling the amount or degree that said reverse bent second leg portion extends from said groove. In addition, passage or port means are provided either in the seal or the surrounding valve structure which permit venting of the interior plenum chamber.

During operation, as the sealing surface of the opposed relatively movable member is positioned to confront the seal ring support groove, said surface will engage the protruding bight segment of said second leg portion. Due to a fact that said second leg portion includes a free end, the seal in free to move relatively inward of the groove without creating substantial forces opposing said engagement. When said movement occurs, said transversely extending lip becomes disengaged from the aforementioned shoulder. Due to the inherent resiliency of the seal, there is effected a substantial initial sealing contact. Further, as the lip means becomes disengaged from the shoulder means, there is provided an access path leading from the fluid line to the interior, plenum chamber of said seal ring, such that line fluid will enter said plenum chamber to wedge or caulk the bight segment of said seal ring member into firm sealing contact with the side wall surface of the groove and the confronting annular sealing surface.

DESCRIPTION OF THE DRAWINGS

Numerous other objects and advantages afforded by the present invention will become apparent from the following detailed description of the invention, which description is had with reference to the accompanying drawings, wherein:

FIG. 12 illustrates the seal in the initial condition. FIG. 13 shown the seal in the pressurized condition.

DESCRIPTION OF THE ILLUSTRATED EMBODIMENT

Referring now to the drawings in greater detail, a disc valve 20, incorporating a preferred embodiment of the present invention is shown in FIGS. 1-5. The valve 20 comprises a valve body 22 defining a flow passage 24, extending therethrough and being adapted, at opposite ends of said flow passage 24, for connection in a conventional manner with coacting conduits 26 and 28, illustrated in phantom in FIG. 1.

Figure 1:
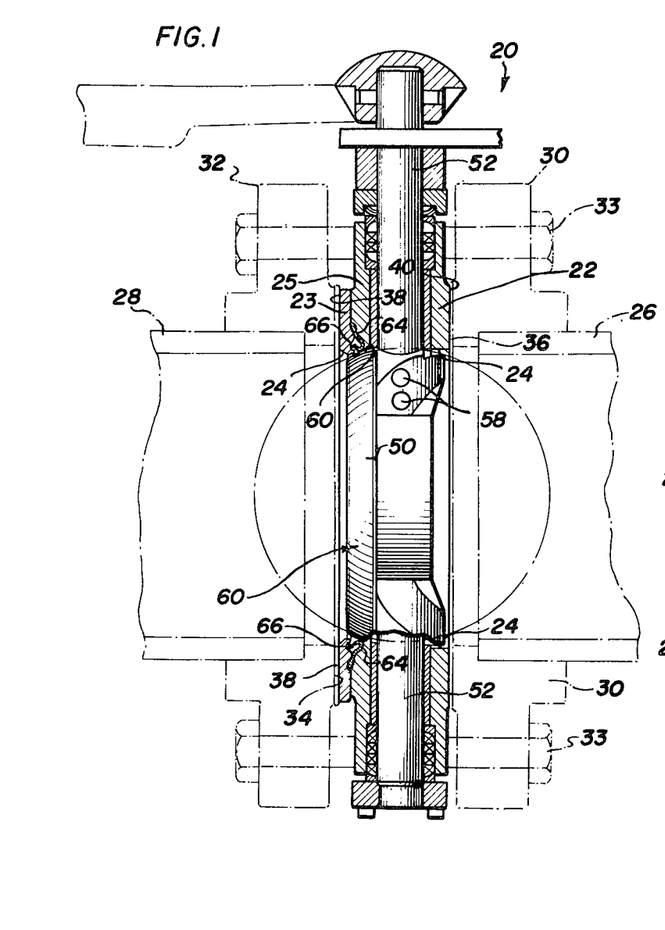
FIG. 1 is a vertical sectional view taken through a disc type valve employing the present invention, and illustrating in phantom the positions of the conduits to be connected to said valve.

With reference to the construction illustrated, attachment flange 30, 32 fitted on the respective conduits 26, 28 are pulled toward each other by an annular series of bolts 33, FIG. 1. A sealed connection is made in a conventional manner through gaskets 34, 36 which engage the generally flat faces 38, 40 encircling opposite ends of the passage 24 on opposite sides of the valve body 22, and retainer 23.

Figure 2:
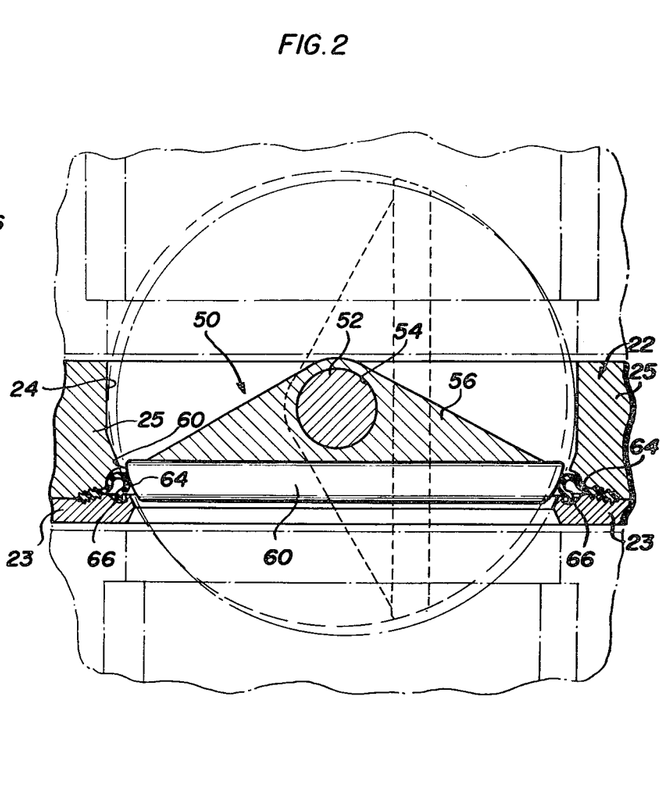
FIG. 2 is a horizontal sectional view taken through the valve of FIG. 1.

Fluid passage 24, FIGS. 1 and 2 is open and closed by a turning of a flow control disc 50 between the close position illustrated in solid lines in FIG. 2, and the open position illustrated in phantom in said FIG. 2. The flow control disc 50 is supported in the valve body 22 and operated by means of a supported shaft 52 extending through a bore 54 defined in a diametrical enlargement 56 for accommodating said shaft 52. The disc 50 is secured in a fixed position in relation to the shaft 52 by anchoring pins 58 extending transversely through the shaft into the disc enlargement 56, as shown in FIG. 1.

Figure 4:
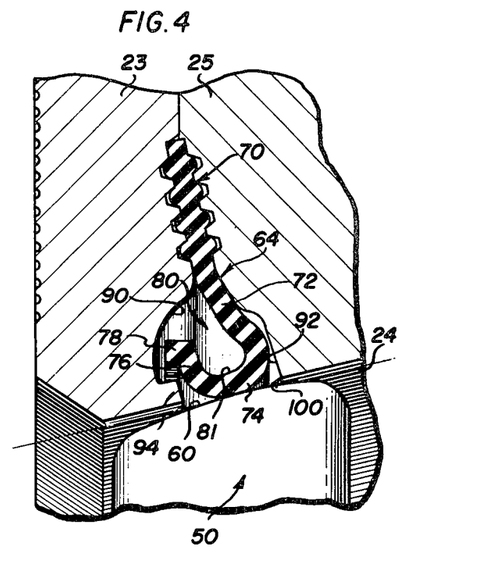
FIG. 4 is a view similar to FIG. 3, but illustrating the position of the parts with the valve disc in the closed position and an initial seal provided by the mechanical engagement of the seal ring member with the opposed sealing surface.
Figure 5:
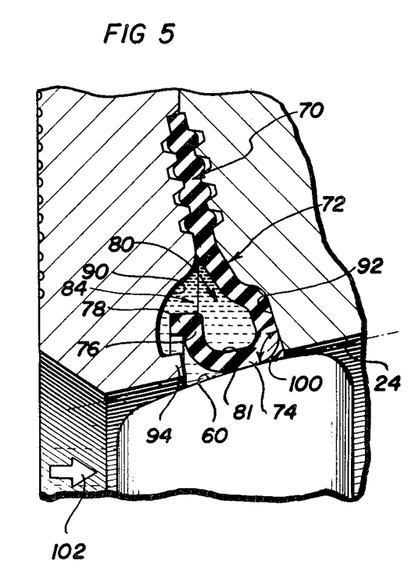
FIG. 5 is a view similar to FIG. 4, but illustrating the condition attained when line pressure is introduced into the valve and the seal ring member becomes pressure loaded.

The periphery of the disc 50 define an annular sealing surface 60 which may be crowned in transverse section as illustrated best in FIGS. 4 and 5. Said disc preferably has a spherical curvature.

Upon turning of the flow control member or disc 50 to its illustrated position, FIGS. 1 and 2, the annular sealing surface 60 is brought into confronting relation to a seal ring member 64 anchored in an annular seal ring support groove 66 formed in the valve body 22. The support groove 66 confronts the annular sealing surface 60 in close proximity thereto when the valve is in the closed condition.

As will be described, the physical relationship between the seal ring support groove 66, the seal ring member 64 and the sealing surface 60, taking into conjunction that the manner in which the seal ring member 64 is anchored for relative movement in the groove 66, are devised to provide dynamic caulking or sealing action of the valve against leakage.

Figure 3:
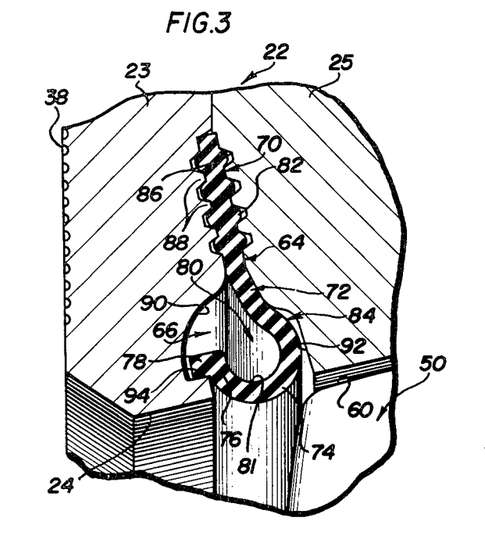
FIG. 3 is a fragmentary sectional view, on an enlarged scale illustrating the disposition of the annular seal ring member in the support groove, with the coating sealing surface of the valve discs being shown displaced from its closed position.

The arrangement of the sealing ring member 64, groove 66 and the sealing surface 60 are shown in more detail in FIGS. 3-5. In this regard, FIG. 3 illustrates the condition of said sealing arrangement prior to engagement of the seal member 64 with the sealing surface 60 of the disc 50. FIG. 4 illustrates the initial sealing contact obtained between the seal ring member 64 and sealing surface 60; while FIG. 5 shows the sealing arrangement of the invention when pressure loaded by the line fluid to attain a dynamic caulking action.

Seal ring member 64 is of an annular construction and is illustrated in section in FIGS. 3-5, and as such will be described with regard to its cross-sectional profile. In this regard, seal ring member 64 includes a first leg portion 70 which provides an anchoring flange, and a second leg portion 72 integral with said first leg portion. Said second leg portion 72 is of a hook shaped, reverse bent configuration, having a generally arcuate bight section 74 and a free end 76. The free end 76 has a transversely disposed, annular lip means 78 formed thereon, for a purpose which will become apparent hereinafter.

The hook-shaped configuration, viz., with the free end 76 spaced from the remainder of the second leg portion 72, provides the seal ring member 64 with an open mouth configuration, which is designated generally 80. The open mouth configuration 80 affords a fluid passage leading to the interior of the seal member 64, the inner wall surface of which defines a plenum chamber 81. In a preferred form of the invention this open mouth configuration 80, and the plenum chamber 81 may be continuous about the full annular extent of the seal ring 64. It is envisioned, however, that supporting ribs, or some other structure maybe employed so as to interrupt the continuous nature of said chamber 81 or said open mouth 80, it being understood that it is only necessary that there be provided a path of egress and ingress for line fluid, and an interior space or spaces subject to pressure loading.

The seal ring member 64 is carried within the seal ring support groove 66, which will also now be described in relation to its cross sectional profile, it being understood that said groove extends about the inner periphery of the fluid passage 24. For purpose of description, the groove 66 is designated as including a first relatively inner section 82 and a second relatively outer section 84. The inner section 82, in the illustrated embodiment, is defined by a pair of closely spaced wall surfaces 86 which firmly engage and clamp the anchoring flange 70 provided by said first leg portion so as to anchor the seal ring member 64 in place. To enhance the clamping action, the side wall surfaces 86 may be provided with arcuate, radially spaced protuberances 88 which engage and elastically distort the material of the anchoring flange 70, causing said material to cold flow into the spaces between said protuberances. If desired, mating grooves may be machined in said anchoring flange 70.

It should be noted, that the body portion 22 includes a main element 25 and a relatively movable member 23, which cooperate to define the groove 66. In this regard, the member 23 is removably affixed to the main element 25 by connecting means (not shown) so that the seal 64 may be placed in position and upon assembly of said members 23 and 25, the clamping action referred to above will be effected.

The second segment 84 of said seal ring support groove 66, accommodates the reverse, bent, hook-shaped second leg portion 72 of said seal member 64. Groove segment 84 is defined by a pair of annular, spaced side wall surfaces 90 and 92. The spacing between said side wall surfaces 90 and 92, with relation to the somewhat bulbous arcuate bight segment 74 formed by the reverse bent portion 72, is such that said second leg portion 72 is free to move relative to said side wall surfaces. As will be explained hereinafter, with regard to FIG. 5, this mobility is important in achieving the dynamic pressure loaded sealing action. Further, the element 23 preferably includes a series of ports or passages 93 (only one of which is shown) which open into the groove 66, for a purpose which will be explained hereinafter.

At the relatively outer extremity of the annular support groove 66, on the side wall surface 90, there is provided, shoulder means 94 upon which the aforementioned transversely extending lip means 78 of the seal is engaged. The purpose for this engagement is to maintain the proper positioning of the reverse bent portion 72 during valve operation, and will be explained in more detail hereinafter.

FIG. 3 illustrates the condition of the sealing arrangement of the present invention, just prior to movement of the disc member 50, into a closed position with the sealing surface 60 in aligned confronting relation with the seal ring 64. As can be seen, the seal ring member 64 is designed such that a substantial segment of the bight portion 74 extends or protrudes from the open end of the support groove 66. As such, said bight section 74 is in position to engage sealing surface 60 as it moves into confronting relation, which condition is shown in FIG. 4. The engagement of the lip means 78 with the shoulder 94, as shown in FIG. 3, serves to limit the degree of extension of said bight section 74 and maintain said bight section in proper position. This is important, as fluid will be flowing through the valve when it is in the fully opened or partially opened condition, and there is a distinct possibility that said fluid may enter the interior of the seal and tend to straighten out said reverse bent leg portion, which would cause the free end thereof to be moved outwardly of the groove. Should this occur, and the value is subsequently moves to a closed position, there is a danger that the second leg portion 72 will be pinched between the sealing surface 60 and wall surface of passage 24 causing damage to said seal member.

The valve of the present invention was designed to handle super-heated liquid media such as steam or the like. Accordingly, when the seal 64 is in the condition, as shown in FIG. 3, provision for the venting of condensate or other liquid from the plenum chamber 81 and groove 66 is needed; this venting is provided by the ports 93. In this regard, condensate or liquid may become trapped interiorly of the seal 64, and when steam or other super-heated media is passed through the valve, the condensate may be brought to the boiling point, creating excessive internal pressure. Without some form of port or drain to permit escape of liquid trapped within groove 66 or the pressure setup upon boiling thereof, there is a danger that the seal will blow out.

Figures 7, 8, 9:
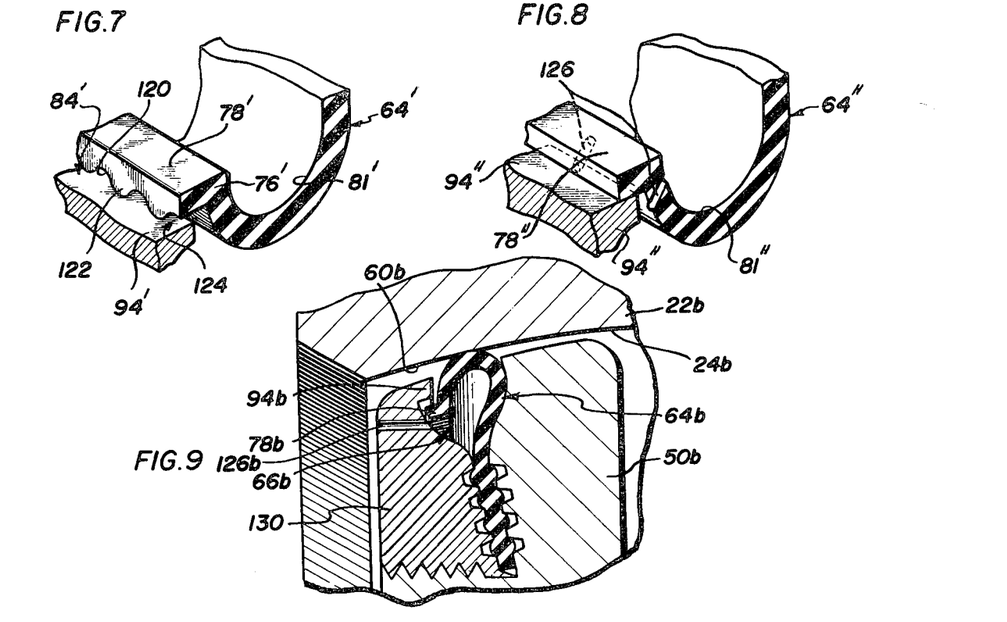
FIGS. 7 and 8 are fragmentary respective views, partially in section, illustrating modified constructions for the seal ring lip means, and the manner of engagement thereof with the opposed shoulder provided by the valve body.
FIG. 9 is a fragmentary sectional view of a modified form of the invention, illustrated in FIGS. 1-5, with the sealing surface formed on the valve body and the annular sealing ring member carried by the valve disc.

With regard to the discussion in the preceeding paragraph, it should be kept in mind that FIG. 3 is a sectional view of the relatively upper portion of the seal 64. In practice, any condensate or liquid trapped in groove 66 will flow to the relatively lower regions of the seal and can exit the groove 66 via the ports 93 in this region. Any liquid which might remain in the groove 66 is afforded ample expansion space, with the ports 93 providing for venting of said groove. As a possible alternate to the ports 93 in the valve body section 23, ports may be provided directly in the seal, as shown in FIG. 8, and discussed hereinafter.

Figure 16:
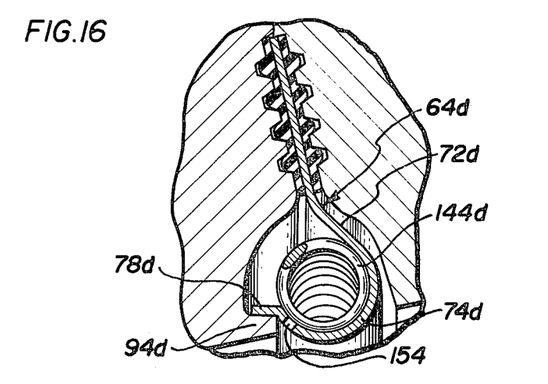

The seal ring member 64 may be made from a wide variety of materials, however it is envisioned that hard plastics such as reinforced Teflon or Kel-F for normal or for cryogenic applications; ultra high molecular weight polyethylene or polytetramethylene terephthalate for radiation resistant, nuclear application; polyimides for high temperature applications, or from other similar materials depending upon the ultimate use, or as is disclosed with regard to FIGS. 16 and 17, the seal may be partially or totally constructed of metal. In any case, the seal ring member will be relatively stiff and will have an inherent resiliency tending to straighten out the reverse bent portion 72, to some extent. As such, the engagement of lip means 78 with flange or shoulder 94 serves to prevent this from occurring.

Directing attention now to FIG. 4, there is shown the condition of the seal assembly upon initial contact, and without the presence of fluid in the passage 24. As the annular sealing surface 60 moves into confronting relation with regard to the support groove 66, it will engage the arcuate bight portion 74 of the seal ring 64 and will tend to bias the reverse bent, second leg portion 72 inwardly of said groove 66. As can be seen from FIG. 4, this inward movement of the leg portion 72 serves to dislodge lip means 78 from the flange 94. Due to the relatively stiff nature of the material which is used to fabricate the seal 64, a degree of mechanical engagement will exist between the bight portion 74 and said sealing surface 60. However, since the bight portion is free to move inwardly during closing, the operating forces are maintained at a low level, in relation to the type of material used for seal 64. Also, the disengagement of the lip means 78 from the shoulder 94 serves to break any seal which would be created thereby and thus establish a path of communication from the fluid passage 24 into the interior plenum chamber 81 of said seal. Further, the arcuate shape of the seal bight portion 74, promote increased initial sealing contact pressure, as the engagement thereof with sealing surface 60 is confined to a relatively narrow annular band.

Further, with reference to the annular seal ring support groove 66, it should be noted that the side wall 90 is curved or otherwise formed to diverge away from the free end 76 so as to permit said free end to move inwardly of said groove. In addition, the outer marginal edge of the opposite side wall surface 92 is closely spaced from the annular sealing surface 60 so as to define therewith an annular caulking or sealing corner 100. In the illustrated embodiment, the relationship of said surface 92 with regard to the sealing surface 60 is substantially that of a right angle, as illustrated by the datum lines of FIG. 9; however, variances of plus or minus (±) 15° are acceptable.

The condition of the seal assembly of the present invention when pressurized fluid is introduced into the fluid passage 24 and the valve is in the closed condition, is illustrated in FIG. 5. In this regard, the fluid flow is indicated by the arrow 102. As mentioned above, upon engagement of the seal ring member 64 with the annular sealing surface 60, the lip means is disengaged from shoulder 94, thereby permitting line fluid to enter the segment 84 of the groove 66. From segment 84 of the groove the line fluid 102 is free to enter the interior plenum chamber 81 of the seal through the open mouth portion 80. Depending upon the pressure established by the line fluid 102, forces, indicated by arrows 103, will be applied interiorly of the bight segment 74 tending to expand said reverse bent portion 72 while causing same to move or pivot toward the caulking corner 100 thereby increasing the degree of engagement with the sealing surface 60 and producing engagement with the sidewall surface 92. This movement tends to wedge or caulk the material of the reverse bent portion 72 into said corner 100 to produce a tight dependable fluid seal. Further, once the condition as shown in FIG. 5 is reached, additional increases in line pressure will tend to straighten out and/or expand portion 72, further increasing forces 103, and correspondingly, the sealing engagement with surface 60.

Figure 10:
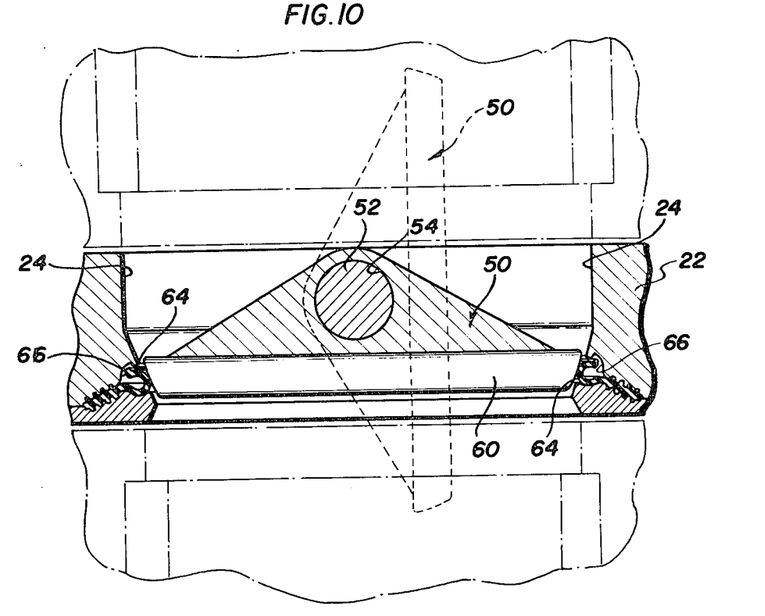
FIG. 10 is a partial, sectional view similar to FIG. 2, but illustrating a modified form of the invention wherein the seal ring member is facing in an opposite direction.

Attention is now directed to a comparison of FIGS. 2 and 10 and the fact that in FIG. 2, the open mouth 80 of the reverse bent leg portion 72 opens away from the valve stem 52, while in FIG. 10 the open mouth portion 80 of the seal illustrated therein opens toward said valve stem. Of significance here, is the fact that the sealing arrangement provided by the seal ring member 64 is a one-way seal; that is, it will only produce an effective seal against high differential pressures wherein the fluid flow 102 is directed toward the open mouth portion 80. When there is fluid on the opposite side of the seal 64 as soon as the fluid pressure exceeds the elastic contact force between the seal and the sealing surface the fluid can work its way under the bight section 74 causing the seal to move upwardly and permit fluid to move therepast.

Figure 6:
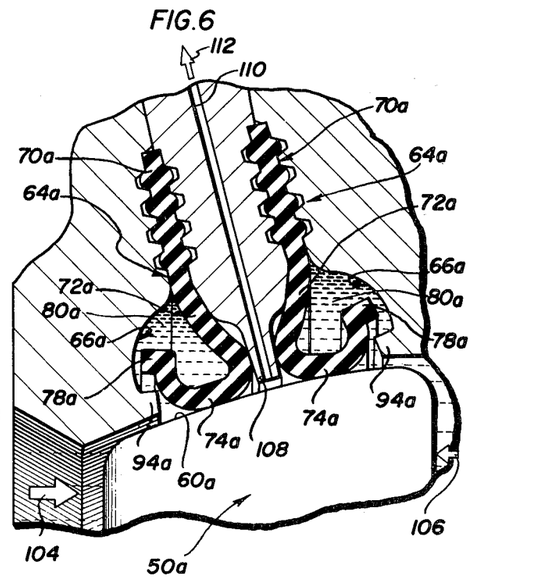
FIG. 6 illustrates a modified form of the present invention wherein a pair of opposed sealing ring members are utilized to provide a "block-and-bleed" type valve.

Discussion will now continue with regard to FIGS. 6-16, wherein various modifications of the present invention are disclosed including various alternate seal designs as well as modified valve arrangements. In these instances, component parts of the present invention previously described are, for purposes of convenience, denoted by the same reference numbers, with the addition of a suffix *a* or *b*, etc., or the addition of a prime (') designation.

Where it is desired or necessary to provide a sealing arrangement which is effective against high pressure fluid flow in both directions, a valve utilizing a double seal arrangement, such as that illustrated in FIG. 6, may be employed, said valve being designated generally 20a. The construction of the valve illustrated in FIG. 6 is what is termed in the art as a "double-block-and-bleed" arrangement, the purpose of which will be explained hereinafter.

Keeping in mind the prior discussion of valve 20 it should be noted that the valve 20a employs a disc member 50a which has an annular sealing surface 60a. Engaged against the annular sealing surface 60a are a pair of oppositely facing seal ring members 64a disposed in support grooves 66a. The construction of the respective seal ring members and support grooves is essentially that as discussed previously, with one being effectively the mirror image of the other. It is important to note however that the seals must be arranged such that the open mouth portions 80a thereof open toward the adjacent disc sides so that the line pressure indicated by arrows 104 and 106 can pressure actuate the respective seal ring members 64a.

In the illustrated embodiment, which as mentioned above is of the "double-block-and-bleed" type, the respective grooves 66a are positioned in spaced relation to define an annular wall portion 108 in the valve body 22a. Formed in this wall portion 108, is a bleed port 110 which communicates with the central passage 24a of the valve body intermediate the respective seals 64a, and also opens to the exterior surface of said valve body 22a. The bleed port 110 should not be confused with the venting ports 93a which cooperate directly with the grooves 66a. As can be seen, bleed port 110 communicates with the annular space between the respective seals 64a. Accordingly, should one of the seal ring members 64a fail in service, the fluid leaking past the seal would enter the port 110 and would flow to the exterior of the valve, as indicated by the arrow 112. Quite clearly, this would function as an indication of the failure of said seal ring member.

The block-and-bleed type of valve is often employed in installation designed to handle chamicals and/or petroleum products, and most particularly, where it is desirable to separate diverse fluid products. In such instances, it is extremely necessary that co-mingling of the liquids on the opposite sides of the valves be prevented. The "double-block-and-bleed" type of arrangement of FIG. 6 serves two important functions in an installation of this type. First as was mentioned above, should one of the valves fail, flow of the liquid out of the bleed port 110 would act as an indication thereof. Also, the product leaking from said port could be analyzed and would provide an indication as to what seal has failed. Secondly, the bleed port 110 provides a form of pressure relief. That is to say, that should any fluid leak past one of the seals 64a and enter the space intermediate the respective seals, any pressure build up would be precluded, as the fluid would be bled off to the atmosphere. If this were not the case, the continued leakage would tend to create a pressure build up that eventually would unseat the other seal member and would permit the liquid products to merge.

Of course, in those instances where the bleed feature of the valve of FIG. 6 is of little or no significance, the bleed port 110 could be eliminated, the structure resulting from said elimination being well within the purview of the present invention.

Turning now to FIGS. 7 and 8, there are illustrated two modified forms of the seal ring member 64, designated 64' and 64", respectively, wherein alternative structure to the ports 93 are provided. With regard to the embodiment of FIG. 7, the transversely disposed lip means on the free end of the second leg portion is provided with means which permits fluid to drain from the interior plenum chamber of said seal member in a manner similar to ports 93 discussed above even though said lip means is seated on the shoulder provided by the adjacent side wall surface of the support groove. As mentioned previously, provision for said drainage becomes important for a number of reasons. First of all, should the valve be initially closed and then opened, fluid could become trapped in the plenum chamber. Should the fluid subsequently convey through the valve by steam or some other high temperature product, the liquid thus trapped would vaporize and create internal pressures which could very well cause the seal to blow out. Secondly, the above-discussed arrangement is desirable in those instances where liquid may leak past the lip into the plenum chamber when the valve is in the open condition, and then rapid closing of the valve is effected. Under these conditions the inward movement of the seal relative to the support groove caused by rapid closing would tend to displace this fluid which could not escape sufficiently fast and there would thus be created opposing forces which would hinder the desired necessary inward movement of the bight portion. Should this occur, the seal would be susceptible to being pinched between the valve body and the disc member 50. With the hereinafter discussed auxiliary passage means of FIG. 7, venting is achieved through the provision of a discontinuity in the surface-to-surface engagement of the lip with the opposed shoulder means.

More specifically, attention is now invited to FIG. 7, where it can be seen that the under surface 120 of the lip means 78' is provided with a plurality of spaced ribs or protuberances 122 which effect the engagement with the shoulder 94'. The spacing between the ribs 122 provides the aforementioned discontinuity in the engagement of the lip means with the shoulder and there is thus provided a series of passageways 124. The passages 124 lead from the interior of the portion 84' of the associated support groove to the central fluid passage 24' and enable a substantial portion of any fluid trapped interiorly of the seal 64' to flow into said central passage 24'.

In the embodiment of FIG. 8, the passageways leading from the interior 81" are provided by holes 126 which are drilled or machined or otherwise formed in the free end 76". These passageways 126 extend into the free end portions 76" of said seal member 64" and provide passages for the escape of fluid from the interior thereof.

While several methods of providing a path or passageway for fluid from the interior of the seal ring member 64" have been shown and discussed with regard to FIGS. 1–8, it should be noted that other, alternative or equivalent constructions may be employed. For example, the shoulders 94' or 94" may be provided with either grooves, protuberances or drilled or machined passageways which would attain the same end as the fluid relief passages formed in portions of the retainer 23 as disclosed and discussed previously.

FIG. 9 illustrates still another embodiment of the present invention that may be employed with a disc type of valve. With this embodiment, the seal ring support groove 66b is provided by the disc member 50b, which carries the seal ring member 64b. Correspondingly, the annular sealing surface 60b is formed on the interior of the body portion 22b about the periphery of the interior passage 24b. The seal ring members 64b and the support grooves 66b are configured essentially in the same manner as those previously discussed and will function in the same general way. It should be noted, however, that the disc member 50b includes an annular removable collar portion 130 which provides by any conventional means for the assembly and clamping in place of the seal ring members 64b. The collar portion 130 is further provided with one or more fluid relief passages 126b, as illustrated.

In the introductory portion of the present specification, reference was made to U.S. Pat. No. 3,563,510, and the novel cauling ring arrangement disclosed therein. With the seal construction of said invention, it was found that maximum sealing effectiveness is obtained with the seal disposed substantially perpendicular, within 15°, to the annular sealing surface. This condition is illustrated by the datum lines A and B of FIG. 9.

Figure 11:
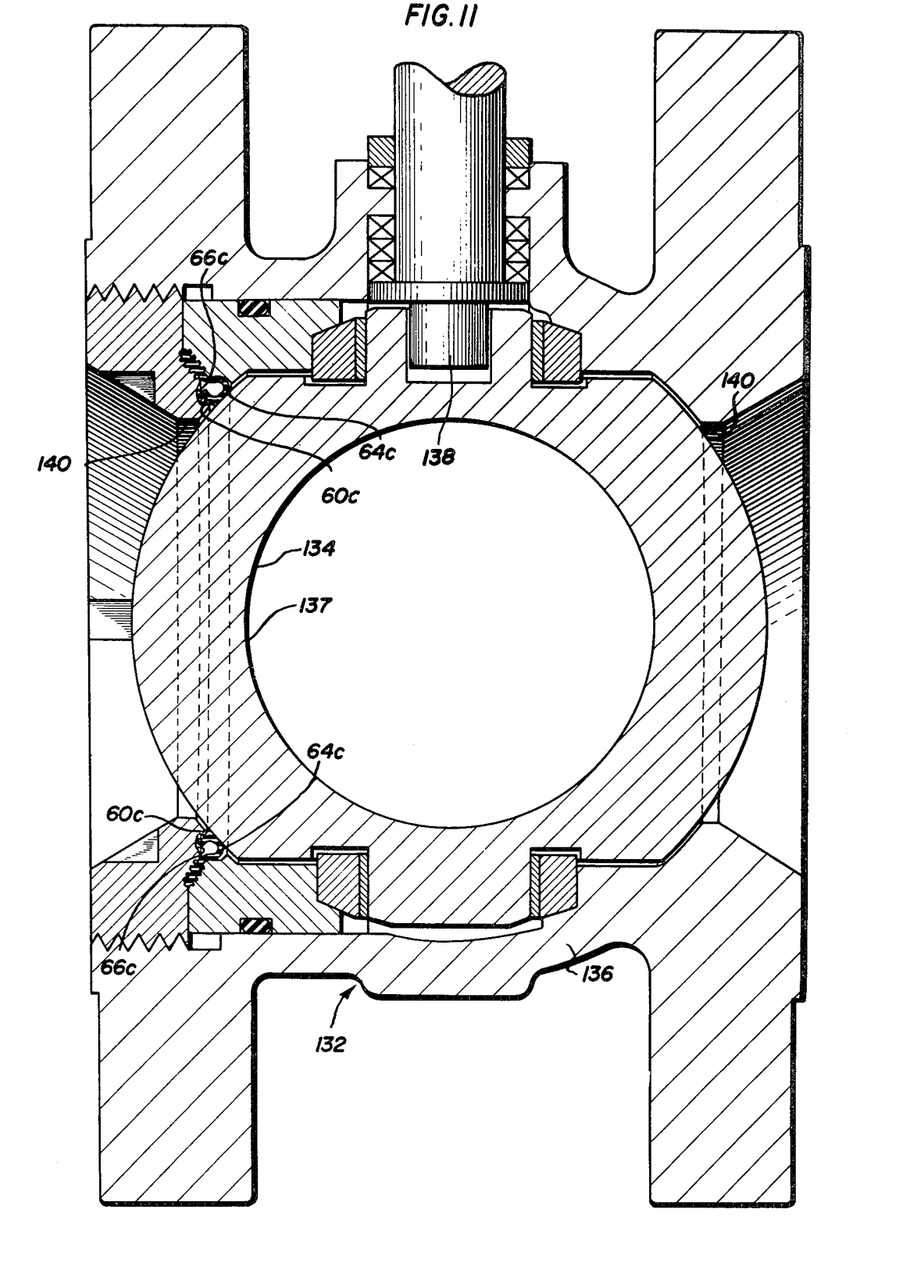
FIG. 11 is a sectional view of still an additional modified arrangement, wherein the novel sealing arrangement of the present invention is employed in conjunction with a ball valve.

In FIG. 11, there is illustrated a ball valve to which the sealing arrangement of the present invention has been applied, said ball valve being designated generally 132. Previously described component parts in this instance are designated by the addition of the suffix c.

Valve 132 is comprised of a flow control ball member 134 disposed within a valve body 136 and having a port 137 formed therein. Said flow control ball member 134 is rotatably mounted within said valve body 136, this operation being effected by a control stem 138, such that said port 137 can be selectively aligned with or disposed transversely of the flow passage 140 defined within the body 136 thus producing the valve open and valve closed conditions.

A spherically curved sealing surface 60c is formed on the ball member 134 in confronting relation to an annular support groove 66c formed in the interior surface of the body 136 and having a seal ring member 64c supported therein. A seal ring support groove 66c is formed in the valve body 136, and is constructed in a manner as previously discussed. The remaining construction of the ball valve 132 is conventional and it is not believed necessary that said element be explained in detail, as they do not constitute essential features of the present invention, and are indeed well known in the art.

Further, it should be noted that the seal ring member 64c is constructed in accordance with the above discussion regarding FIGS. 1–5, and as such will function in exactly the same member. It is further noted that the valve 132 as illustrated has but one seal ring member and as such is a one-way valve. It is envisioned that a second seal ring member could be employed at the opposite end of the valve body 136 so as to produce a two-way or a "double-block-and-bleed" arrangement if so desired.

Figure 12:
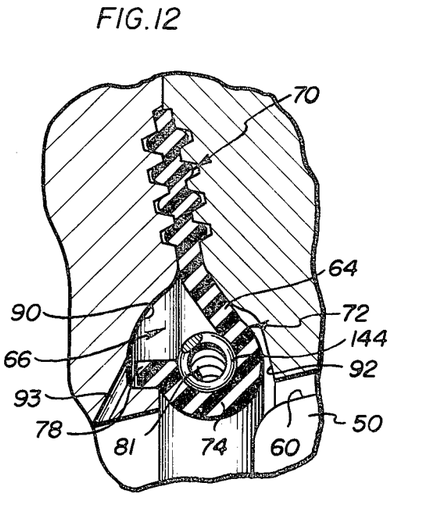
FIGS. 12 and 13 are transverse sectional views, similar to FIGS. 3 and 5, but illustrating a modified construction for the seal wherein spring means are disposed within the plenum chamber.
Figure 13:
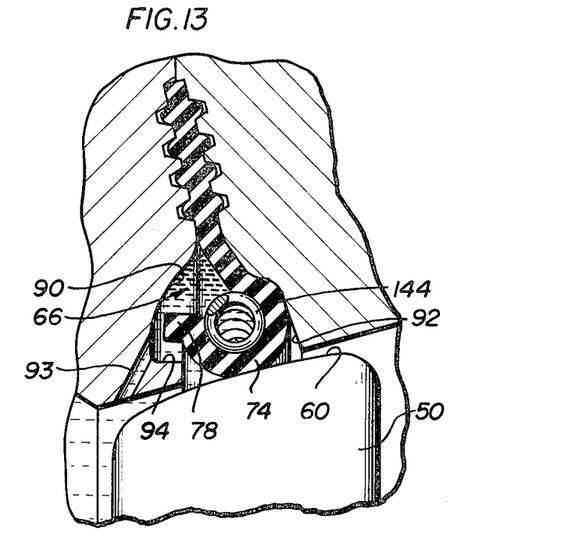

In FIGS. 12-13 there is disclosed a modification of the seal ring member 64, wherein biasing means in the form of a helically wound, annular spring 144 is disposed within the plenum chamber 81 thereof. The annular spring means 144 tends to bias the second leg portion 72 to the position illustrated in FIG. 12, with the lip means 78 firmly engaged against shoulder 94 and the bight portion 74 extending outwardly of said groove. In FIG. 13, the seal is shown in the valve closed condition, wherein the disc 50 has engaged the seal 64 to move said seal inwardly of groove 66, with the bight section 74 engaged against sealing surface 60. Thus, by use of the spring means 144, the initial sealing pressure created prior to the introduction of the line pressure within the plenum chamber 81 can be controlled, and/or enhanced, without resort to relatively stiff materials for seal 64. The spring means 144 also serves a number of functions in that it sustains the bight section 74 of seal 64 against collapse by a fluid disposed against the back or upstream side thereof.

Figure 14:
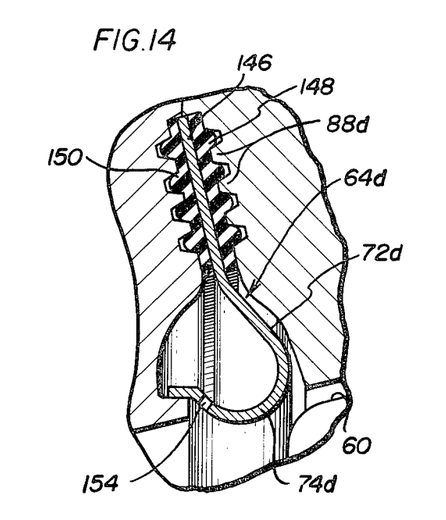
FIGS. 14, 15 and 16 are sectional views similar to FIGS. 12 and 13 of still a further modified form of the invention, where the seal is constructed partially of metal.
Figure 15:
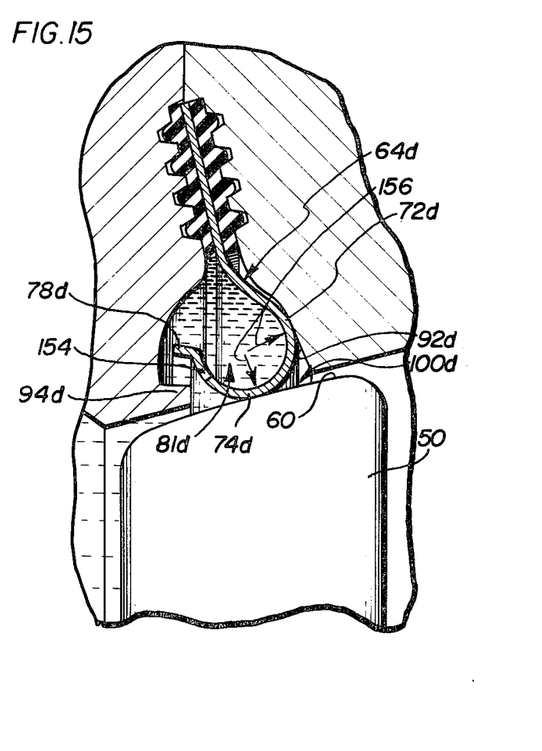

For extremely high temperatures uses, the modified seal arrangements of FIGS. 14-16 may be employed. In this regard, the seal ring member is designated generally 64d for reference purposes and includes a second leg portion 72d that is formed from a spring-like metal having high resistance to heat and corrosion, such as stainless steel or other metal alloys. The basic configuration and operation of the second leg portion 72d is essentially that as discussed above, with the possible exception of the degree of expansion attained during use. This of course will depend upon the material used and pressures encountered.

The first leg portion 70d of seal 64d, which portion provides the anchoring flange, is comprised of a metal lip setment 146 which is integral with the previously mentioned second leg portion 74d and is sandwiched between a pair of annular ring like members 148 and 150 bonded or otherwise attached thereto. The ring members 148 and 150 are formed from a somewhat elastic gasket material and as such during clamping said ring members will cold flow into the spaces provided by the protuberances 88d formed on the opposed surfaces 86d of the clamping section of said groove. It should be noted, that the ring members 148 and 150 are not necessary for the function of the seal arrangement and leak-tight clamping of the leg portion 70d in the groove 66d can be achieved by other conventional means.

As mentioned above, the operation of the seal 64d is similar to that as shown in FIGS. 3-5. In this regard, FIG. 15 illustrates the seal 64d in the pressure loaded condition. Here the free end 78d has been disengaged from seat or shoulder 94d and pressurized fluid has entered the plenum chamber 81d. Since the arcuate bight segment 74d is engaged with surface 60 to provide a seal, the build up of pressure within the plenum chamber 81 will create forces, as indicated by arrows 156. These forces will cause the entire portion 72d of the seal to pivot or move from the position shown in FIG. 14 to that illustrated in FIG. 15, where said bulbous portion 72d fills the corner 100d. In this condition, the bulbous portion will engage both the wall 92d and sealing surface 60, with any increase in pressure or force within the plenum chamber 81d tending to cause the curved bight portion 74 to straighten out, thus increasing the sealing pressure or engagement of the seal 64d with sealing surface 60. While the seal 64d, being constructed of metal, may not expand to the extent of the seal 64 discussed previously, this is of course a matter determined by the respective materials used, and the pressure condition encountered.

As was the case with the modifications discussed previously, the metal seals 64d, FIGS. 14-16, include means for permitting fluid to drain from the plenum chamber 81d. In this regard, ports 154 may be drilled directly into the free end portion 78d, as illustrated. Of course, these ports 154 (only one of which is illustrated) should be remote from the point of sealing engagement with surface 60. Also, venting or porting means, such as discussed with the previously disclosed embodiments, may be employed.

As shown in FIG. 16, if desired, the seal 64d may be provided with an internal biasing means in the form of a coiled annular spring 144d similar to that as discussed with regard to FIG. 15.

The present invention has been described with regard to a number of modifications, but most particularly with regard to disc and ball valves. It will be appreciated by those skilled in the art that this invention is equally adaptable to other types of valve constructions and is thus not limited to the detailed construction of the valves illustrated and described. As such, numerous modifications, variations or equivalents will be apparent to those skilled in the art, and insofar as these fall within the spirit and scope of the claims appended hereto, they are indeed covered by the present invention.

The invention is claimed as follows:

1. A valve comprising, in combination, a first element constituting a valve body defining a flow passage extending therethrough, a second element constituting a flow control member movably supported relative to said body for movement between an open position and a closed position for opening and closing said flow passage, one of said elements defining an annular sealing surface, the other of said elements defining an annular seal ring support groove oriented to confront said sealing surface in close proximity thereto; an annular seal ring member disposed in said support groove, said seal ring member, in section, including a first leg portion providing an annular anchoring flange, and a second leg portion including, an intermediate section extending in a direction toward said sealing surface as a continuation of said first leg portion, a reverse bent, bight segment of an arcuate shape joined to said intermediate section and extending radially outward of said support groove, said bight segment being joined with a free end segment which extends into said support groove oppositely of said intermediate section and spaced from said intermediate section, and lip means formed on said free end interiorly of said support groove and extending transversely thereof in a direction away from said intermediate section of said second leg portion, such that said bight segment and said free end segment serve to define with the remainder of said second leg portion and interior plenum chamber; said seal ring support groove including a first section for receiving said anchoring flange in fixed engagement therein, and a second section within which said second leg portion is disposed with said bight segment extending from said seal ring support groove for confronting sealing engagement with said annular sealing surface, said second section of the seal ring support groove being defined by spaced apart side surfaces, one of said surfaces defining shoulder means extending axially inward of said groove upon which said transversely extending lip means is engaged to maintain the free end of said second leg portion in said groove and to define the limit of the extension of said bight segment from said support groove, said bight segment extending from said groove a sufficient distance such that upon the engagement of said bight segment with said annular sealing surface upon movement of said flow control member to the valve closed condition, said second leg portion will be moved inwardly of said annular seal support groove to disengage said lip means from said shoulder means a sufficient amount to allow line fluid to enter said seal support groove and said plenum chamber, thereby to pressurize said seal, said sealing surface on said one element being disposed in close proximity to said confronting support groove in said valve closed condition, with the side surface of said support groove opposite said side surface having the shoulder means formed thereon, being disposed to form with said sealing surface an annular substantially right angle caulking corner, such that due to the close proximate of said sealing surface and said groove, and the provision of said caulking corner, upon said seal being pressurized, line pressure will force said bight segment into said caulking corner, with portions of said bight segment being forced into sealed engagement with said side surface and sealing surface defining said annular caulking corner, and means providing one or more passageways connecting the interior of said second section of said ring support groove with said flow passage such that fluid can escape from said plenum chamber even though said lip is engaged with said shoulder means.

2. A valve according to claim 1, wherein said support groove is formed on the body of said valve, with said sealing surface being formed upon said flow control member.

3. A valve as defined in claim 1, wherein said support groove is defined by said flow control member, with the annular sealing surface being formed on said valve body.

4. A valve as defined in claim 1 wherein said flow control member is a disc element disposed in said flow passage and carried by a stem rotatably mounted with respect to said valve body whereby said disc member is movable between a first position with the upstream surface of said disc element disposed perpendicular to the axis of said flow passage and thereby define a valve closed position, and a second position with said upstream surface disposed generally parallel to the axis of said flow passage to define a fully open position for said valve.

5. A valve as defined in claim 1 wherein said means providing said one or more passageways from the support groove to said fluid passage includes one or more ports formed in said other element defining said support groove.

6. A valve as defined in claim 1, wherein said means providing said one or more passageways from the support groove to said fluid passageway includes means on said lip means providing a discontinuity in the surface-to-surface engagement of said lip means with said shoulder means, whereby fluid may pass into and out of the interior of said seal ring support groove through the passagway defined by said discontinuities, even though said lip means is engaged with said shoulder means.

7. A valve as defined in claim 6, wherein said means providing for the discontinuity in a surface-to-surface engagement of said lip and shoulder means comprises one or a plurality of circumferentially spaced projections formed on said lip means which thereby define one or a plurality of said passageways for the ingress and egress of fluid when engaged with said shoulder means.

8. A valve as defined in claim 1, wherein said means providing said one or more passageways from the support groove to said fluid passage includes one or a plurality of through passageways formed in said second leg portion of said seal for the ingress and egress of fluid from the interior of said seal ring support groove.

* * * * *

UNITED STATES PATENT AND TRADEMARK OFFICE
CERTIFICATE OF CORRECTION

PATENT NO. : 4,044,994
DATED : August 30, 1977
INVENTOR(S) : Werner K. Priese

It is certified that error appears in the above-identified patent and that said Letters Patent are hereby corrected as shown below.

Column 2, line 55, "in" should be --is--;
Column 3, lines 16-17, "coating" should be --coacting--;
Column 3, line 39, "sealing" should be --seal--;
Column 4, line 14, "supported" should be --support--;
Column 6, line 12, "value" should be --valve--;
Column 10, line 28, "cauling" should be --caulking--;
Column 10, line 62, "member" should be --manner--;
Column 11, line 21, "temperatures" should be --temperature--;
Column 11, line 36, "74d" should be --72d--;
Column 13, line 27, after "said" second occurrence, insert -- seal --.

Signed and Sealed this

Thirty-first Day of January 1978

[SEAL]

Attest:

RUTH C. MASON
Attesting Officer

LUTRELLE F. PARKER
Acting Commissioner of Patents and Trademarks